United States Patent [19]
White

[11] Patent Number: 6,049,877
[45] Date of Patent: Apr. 11, 2000

[54] SYSTEMS, METHODS AND COMPUTER PROGRAM PRODUCTS FOR AUTHORIZING COMMON GATEWAY INTERFACE APPLICATION REQUESTS

[75] Inventor: John Gregg White, Cary, N.C.

[73] Assignee: International Business Machines Corporation, Armonk, N.Y.

[21] Appl. No.: 08/895,350

[22] Filed: Jul. 16, 1997

[51] Int. Cl.[7] .................................................. H04L 9/00
[52] U.S. Cl. ...................... 713/201; 713/172; 713/185
[58] Field of Search ..................... 395/187.01; 713/201, 713/159, 172, 185; 709/203, 227, 228, 229, 302; 364/241.8

[56] References Cited

U.S. PATENT DOCUMENTS

| | | | |
|---|---|---|---|
| 5,774,670 | 6/1998 | Montulli | 395/200.57 |
| 5,802,518 | 9/1998 | Karaev et al. | 707/9 |
| 5,884,312 | 3/1999 | Dustan et al. | 707/10 |
| 5,892,905 | 4/1999 | Brandt et al. | 395/187.01 |
| 5,908,469 | 6/1999 | Botz | 713/201 |
| 5,961,601 | 10/1999 | Iyengar | 709/229 |

OTHER PUBLICATIONS

William E. Weinman, "The CGI Book", Chapters 6 & 7, pp 117–179, Mar. 1996.
Asbury et al, "CGI How–To", pp 489–494, 1996.
Ian S. Graham, "HTML Sourcebook", pp 109–111 (chapter 2) & 181–230 (chapter 4), Mar. 1995.

*Primary Examiner*—Robert W. Beausoliel, Jr.
*Assistant Examiner*—Scott T. Baderman
*Attorney, Agent, or Firm*—Myers Bigel Sibley & Sajovec, P.A.; Jeanine S. Ray-Yarletts

[57] ABSTRACT

Systems, methods, and computer program products for authorizing a client request to a web server to execute a CGI application are provided. A web server receives a client request to execute a CGI application from a client. Authentication routines shared by a set of CGIs are executed by the requested CGI application to determine if the request is accompanied by an authentication token. If one is not received, then the CGI attempts to authenticate the client. Upon successful authentication, the CGI creates an authentication token using an authentication key and transmits the token to the client. The authentication token contains token data which is verifiable by the CGI application. Subsequent client requests to execute this or other CGI applications in this set of CGIs instrumented with the authentication routines are accompanied by the authentication token. The requested CGI executes its authentication routines to validate the authentication token and returns the requested output.

14 Claims, 5 Drawing Sheets

FIG. 3

SYSTEMS, METHODS AND COMPUTER PROGRAM PRODUCTS FOR AUTHORIZING COMMON GATEWAY INTERFACE APPLICATION REQUESTS

FIELD OF THE INVENTION

The present invention relates generally to client-server communications, and more particularly to client-server communications for controlling access to web servers.

BACKGROUND OF THE INVENTION

The paradigm for the Internet is that of a client-server relationship where Internet clients communicate with Internet servers. In a client-server relationship, a client (e.g. a web browser) communicates with a web server via a communications network, such as the Internet or a private Intranet. The web browser communicates with the web server using the Transmission Control Protocol/Internet Protocol (TCP/IP). For the majority of Internet communications a web browser communicates with a web server using the generic Hyper-Text Transfer Protocol (HTTP) which is transmitted between the web browser and the web server over the TCP/IP link between the web browser and the web server. HTTP transactions are short-lived. A TCP connection is established for each client request. The serer does not maintain any state information about clients. The actual data transferred between the web browser and the web server are HTTP data objects (e.g. Hyper-Text Markup Language (HTML) data). Oftentimes, a web server in an Intranet will serve the dual role of a proxy server and route requests from Intranet web browsers to Internet web servers.

Standard web content consists of static HTML pages. It is sometimes desirable to provide a client with dynamically created customized HTML pages. For example, it may be desirable to execute a program on a web server that searches a database, formats the search results, and transmits the search results to the client for display to the user. A mechanism for doing this and other interactive functions is called Common Gateway Interface (CGI). CGI is a standard that allows clients to interface with various applications via web servers. A web server processes a client CGI request using a CGI script or application. For example, when a database is queried by a client, the web server acts as a gateway between the database and the client. The web server transmits the client request to a CGI application that performs the database query, formats the results and returns HTML-formatted data to the web server. The web server then transmits the HTMLformatted data to the client for display to the user.

CGI applications which perform sensitive or commercial tasks are typically stored within a secure directory tree of a web server and access to the directory tree is controlled for security reasons. Typically, CGI access control is not performed at the CGI level, but rather, uses standard HTTP-layer authentication, which is implemented in a non-standard, web server-specific and operating system-specific fashion. HTTP-layer authentication typically requires HTTP challenge/response requests between a client and web server for any file in a secured directory tree on the web server. Challenge/response typically requires a user name and password from the client which is then validated by a web server specific or operating system specific security mechanism to provide user level access control to CGI applications at the HTTP layer. Because the location of directory trees and their security configurations can vary from server to server, Web server administrators using CGI applications need to be familiar with the administration of each type of web server hosting a CGI application. In a heterogeneous computing environment, which is common in both small and large enterprises, this is difficult because web server administration and security mechanisms typically vary from server to server and from operating system to operating system.

Nonuniform web server administration and security also pose a problem to developers of CGI applications such as web based user interfaces and management tools which target different brands of web servers on one or more operating systems. Such software typically has its own product security mechanism for user level access control. obtaining user name and password information by a CGI application from a web server which acquired it via HTTP challenge/response is server specific and typically involves writing additional software which is loaded by the web server and must communicate with the CGI. Application programming interfaces (APIs) are provided by web servers for this and other purposes.

Examples of APIs include ICAPI for the IBM Internet Connection server, NSAPI for the Netscape Suitespot web server, and ISAPI for the Microsoft Internet Information Server. Server API programming is not viable for CGI application providers wishing to be usable by any web server on any operating system.

Nontrivial CGI software is typically a collection of CGI applications. User level access security for multiple CGIs using HTTP authentication is achieved by placing all the CGIs in a common file directory, and the web server configuration is modified to make this directory secure. When HTTP authentication is not used, each CGI must have its own security mechanism to obtain and validate user-names and passwords when user level access control is desired. Client authentication is required for each CGI request.

SUMMARY OF THE INVENTION

In view of the above limitations it is one object of the present invention to provide authenticated access to a CGI application that is web server-independent.

It is an additional object of the present invention to provide authenticated access to a CGI application that is operating system-independent.

It is an additional object of the present invention to provide a common, non HTTP challenge/response based authentication mechanism for multiple CGI applications.

These and other objects of the present invention are provided by methods, data processing systems and computer program products for authorizing a client request to a web server to execute a CGI application. A web server receives a client request to execute a CGI application from a client. The CGI is one of a set of secured CGI applications. If the request is not accompanied by an authentication token, the authentication routine of the CGI creates an authentication token and transmits the token to the client. The authentication token is created using an authentication key and data derived from user supplied input. In response to receiving subsequent client requests to execute CGI applications from the set of secured CGI applications, the web server validates the received authentication token by verifying it was forged from valid data with the correct authentication key. When the initial request is received, the CGI returns a form to the client requesting a user name and password. The CGI uses this information to grant access, thus providing user level access control at the CGI level. This information is also used for authentication token creation and for subsequent token validation.

The present invention provides user-level access control to CGI applications. Furthermore, by assigning a common authentication routine to each CGI application within a set which can generate and validate an authentication token, user-level access control may be provided such that any of multiple CGI applications within a set can be executed upon request by an authenticated client. The present invention is advantageous because user-level access to CGI applications occurs above the HTTP layer. Consequently, a common or generic authentication mechanism can be applied to each CGI application within a set. Once a user has been granted access to a CGI application within the set, the user will have access to all CGI applications within the set until the authentication key expires. The present invention is also advantageous because it is web server independent and operating system independent. User-level access can be granted to a set of CGI applications on any web server running on any operating system.

BRIEF DESCRIPTION OF THE DRAWINGS

FIG. 3 illustrates an HTML form for transmitting data to a CGI application for processing.

DETAILED DESCRIPTION OF THE INVENTION

Figure 1:
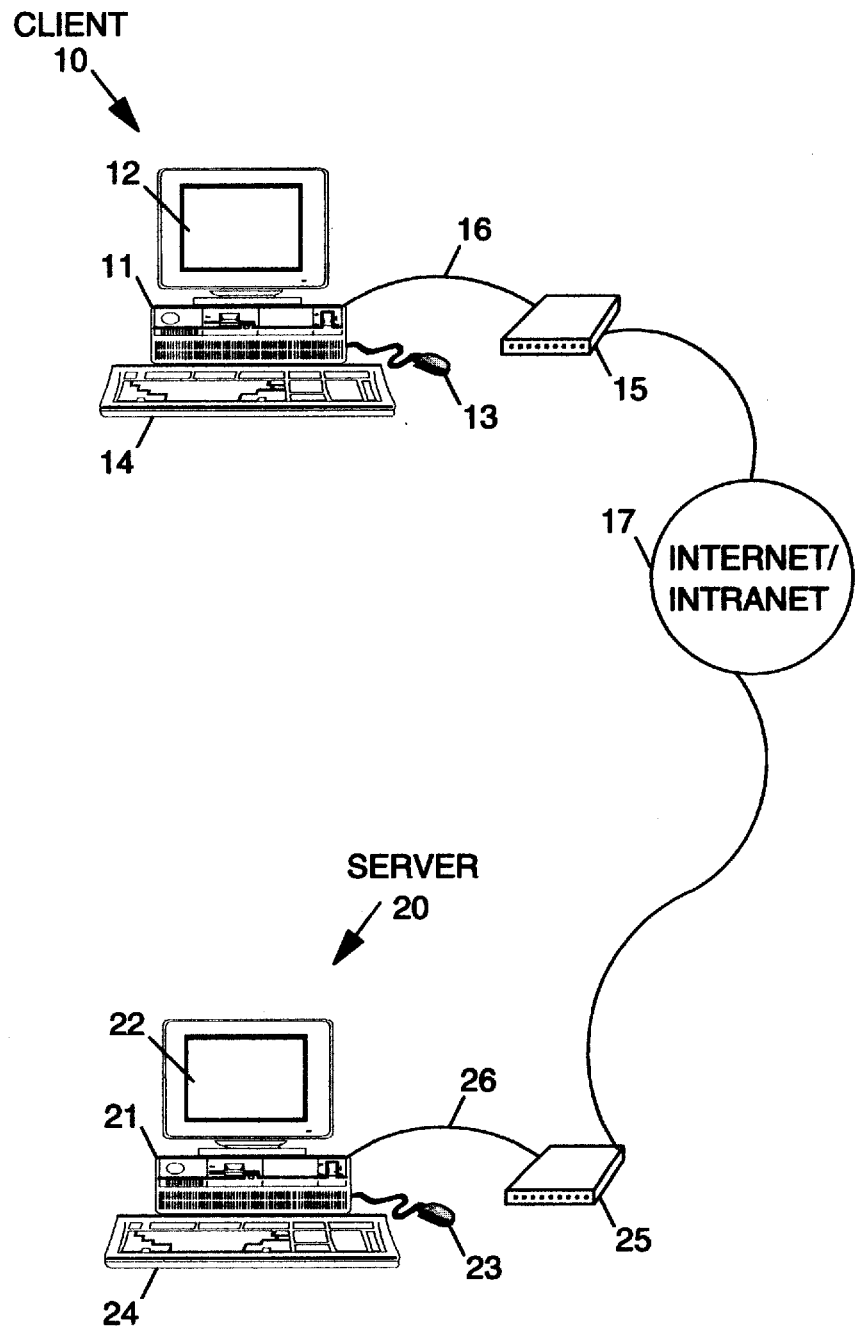
FIG. 1 schematically illustrates a client and server in communication via a computer network.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The present invention will now be described more fully hereinafter with reference to the accompanying drawings, in which preferred embodiments of the invention are shown. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computerreadable program code means embodied in the medium. Any suitable computer readable medium may be utilized including hard disks, CD-ROMS, optical storage devices, or magnetic storage devices.

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Client-Server Communications

As is known to those with skill in the art, client-server environments may include public networks, such as the Internet, and private networks often referred to as "Intranets." Hereinafter, all references to web pages shall include web pages residing on servers connected to the Internet and web pages residing on servers connected to an Intranet. Hereinafter, the term "Internet" shall incorporate the term "Intranet" and any references to accessing the Internet shall be understood to mean accessing an Intranet as well. Hereinafter, the term "computer network" shall incorporate publicly accessible computer networks and private computer networks. The term "hypertext document" shall include web pages residing within HTTP servers (also referred to as web servers).

As illustrated in FIG. 1, users may access the Internet via a computer or terminal referred to as a client 10. Exemplary clients 10 may include, but are not limited to, an Apple®, Sun Microsystems®, IBM®, or IBM-compatible personal computer. A client 10 preferably includes a central processing unit 11, a display 12, a pointing device 13, a keyboard 14, access to persistent data storage, and an Internet connection 16 for connecting to the Internet 17. The keyboard 14, having a plurality of keys thereon, is in communication with the central processing unit 11. A pointing device 13, such as a mouse, is also connected to the central processing unit 11. The Internet connection 16 may be made via a modem 15 connected to traditional phone lines, an ISDN link, a T1 link, a T3 link, via cable television, via an ethernet network, and the like. The Internet connection 16 may be made via a third party, such as an "Internet Service Provider" ("ISP"). The Internet connection 16 may be made either by a direct connection of the client 10 to the Internet or indirectly via another device connected to the Internet. In the latter case, the client 10 is typically connected to this device via a local or wide area network (LAN or WAN). Preferably, data transfer rates between a client 10 and a server are equal to, or greater than, fourteen thousand four hundred baud (14,400 baud). However, lower data transfer rates are sometimes encountered.

The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a client 10 and a server (described in detail below) to store various data transferred from the server.

Preferably, a client 10 has an Intel® 80386 processor (or equivalent) with at least eight megabytes (8 MB) of RAM, and at least five megabytes (5 MB) of persistent computer storage 15 for caching. Even more preferable is an Intel® 80486 or Pentium® processor (or equivalent). However, it is to be understood that various processors may be utilized to carry out the present invention without being limited to those enumerated herein. Although a color display is preferable, a black and white display or standard broadcast or cable television monitor may be used. A client 10, if an IBM®, or IBM-compatible personal computer, preferably utilizes either a Windows®3.1, Windows 95®, Windows NT®, Unix®, or OS/2® operating system. However, it is to be understood that a terminal not having computational capability, such as an IBM® 3270 terminal or a network computer (NC), or having limited computational capability, such as a network PC (Net PC) may be utilized in accordance with an embodiment of the present invention for accessing the Internet in a client capacity.

A user accesses a web page by establishing a TCP connection between the client 10 and a server 20 (referred to hereinafter as a web server) hosting the web page. For the majority of Internet communications, a client communicates with a web server using HTTP protocol over the TCP connection between the client and web server. The data transferred between the client and the web server are HTTP data objects (e.g. HTML data). A web server may be a proxy that receives requests from a number of clients and routes the requests to the appropriate web server. A web server may also be referred to as an HTTP server.

A web server 20 may have a configuration similar to that of a client 10 and may include a central processing unit 21, a display 22, a pointing device 23, a keyboard 24, access to persistent data storage 25, and an Internet connection 26 for connecting to the Internet 17 via a modem 25, or otherwise. It is preferable that a web server have an Intel® Pentium® processor or equivalent, at least sixteen megabytes (16 MB) of RAM, and at least eight hundred megabytes (800 MB) of data storage. However, a web server 20 may be implemented using other processors and via other computing devices, including, but not limited to, mainframe computing systems and mini-computers. Web server software handles requests from clients for documents, whether they are text, graphic, multimedia, or virtual. The web server software may run under the operating system of the web server.

Figure 2:
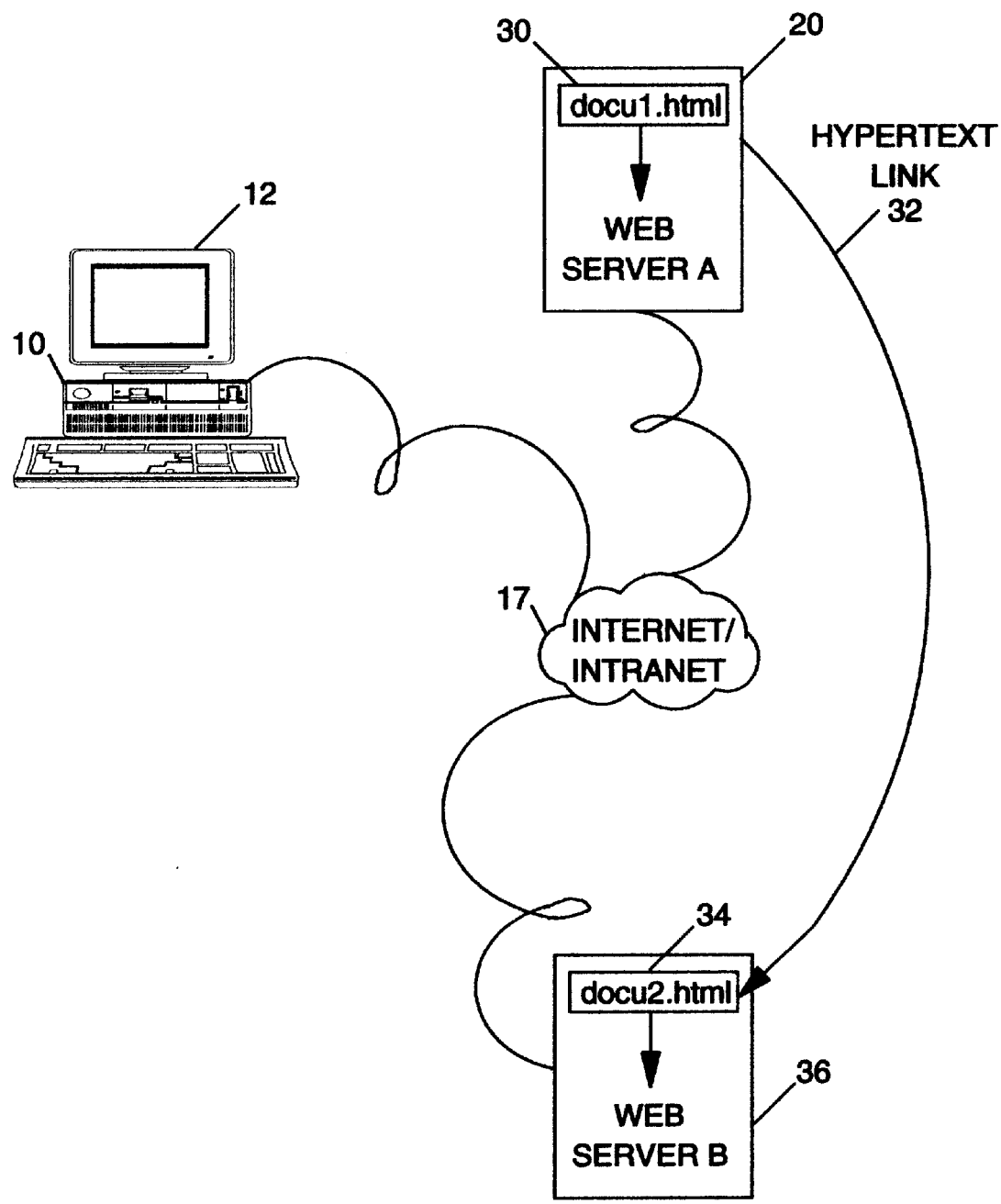
FIG. 2 schematically illustrates a client accessing a hypertext document, such as a web page hosted by a web server.

Referring now to FIG. 2, accessing a web page hosted by a web server is schematically illustrated. During a typical communication, a client 10, via a browser residing on the client, makes a TCP/IP request for a web page 30 from the host web server 20 and displays the web page on the client display device 12. If the displayed web page 30 contains a hypertext link 32, the user can activate that link, and the browser will retrieve the linked web page 34 from its host web server 36.

It is understood that a client or web server or other apparatus configured to execute program code embodied within computer usable media, operates as means for performing the various functions and carries out the methods of the various operations of the present invention.

Common Gateway Interface

CGI provides a standard interface for clients to interface with applications via web servers. More generally, CGI provides dynamically generated content to a client. A user can utilize an application written in virtually any computer language to interface and communicate with a web server via CGI, as long as the web server understands the CGI protocol. CGI communications are handled by parsing standard input and output. As is known by those skilled in the art, CGI can handle virtually any computer language that can print to the standard output, read from the standard input, and read environment variables. Most programming languages and many scripting languages perform all three of these functions including compiled languages such as C and interpreted languages such as Perl.

Figure 3:
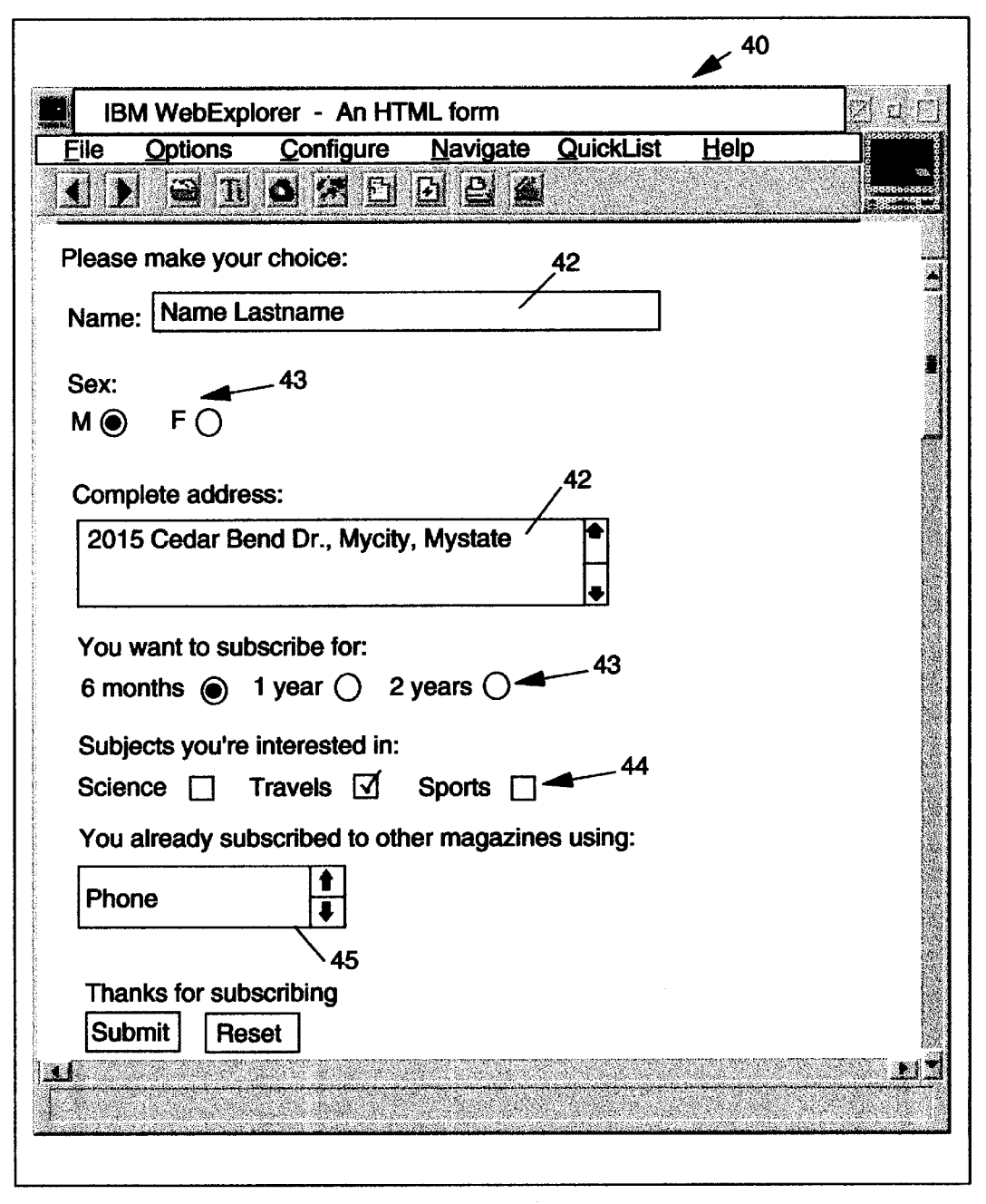

An exemplary CGI application is one that takes information submitted by a user via a client to a web server, processes the information, and returns the processed information to the user. Sending information to a web server to be processed by a CGI application typically requires the use of an HTML document known as a "form." Referring to FIG. 3, an exemplary form 40 is illustrated. Forms are generated using HTML tags that provide various data entry features such as text fields 42, radio buttons 43, check boxes 44, menu lists 45, and the like. A form, such as the form illustrated in FIG. 3, is typically filled out by a user. Upon user activation, the client browser encodes the information and submits it to the web server specified in the form. When the information is received by the specified web server, and if the user is authorized, the web server executes the CGI application specified in the HTML form, which performs some function on or with the transmitted information. The web server then transmits responses or processing results to the client via another HTML document. Interactivity between a client and CGI application on a web server can be provided by utilizing multiple iterations of this process using forms and CGI applications. However, each user typically must be granted access to CGI applications which perform sensitive or commercial tasks.

Figure 4:
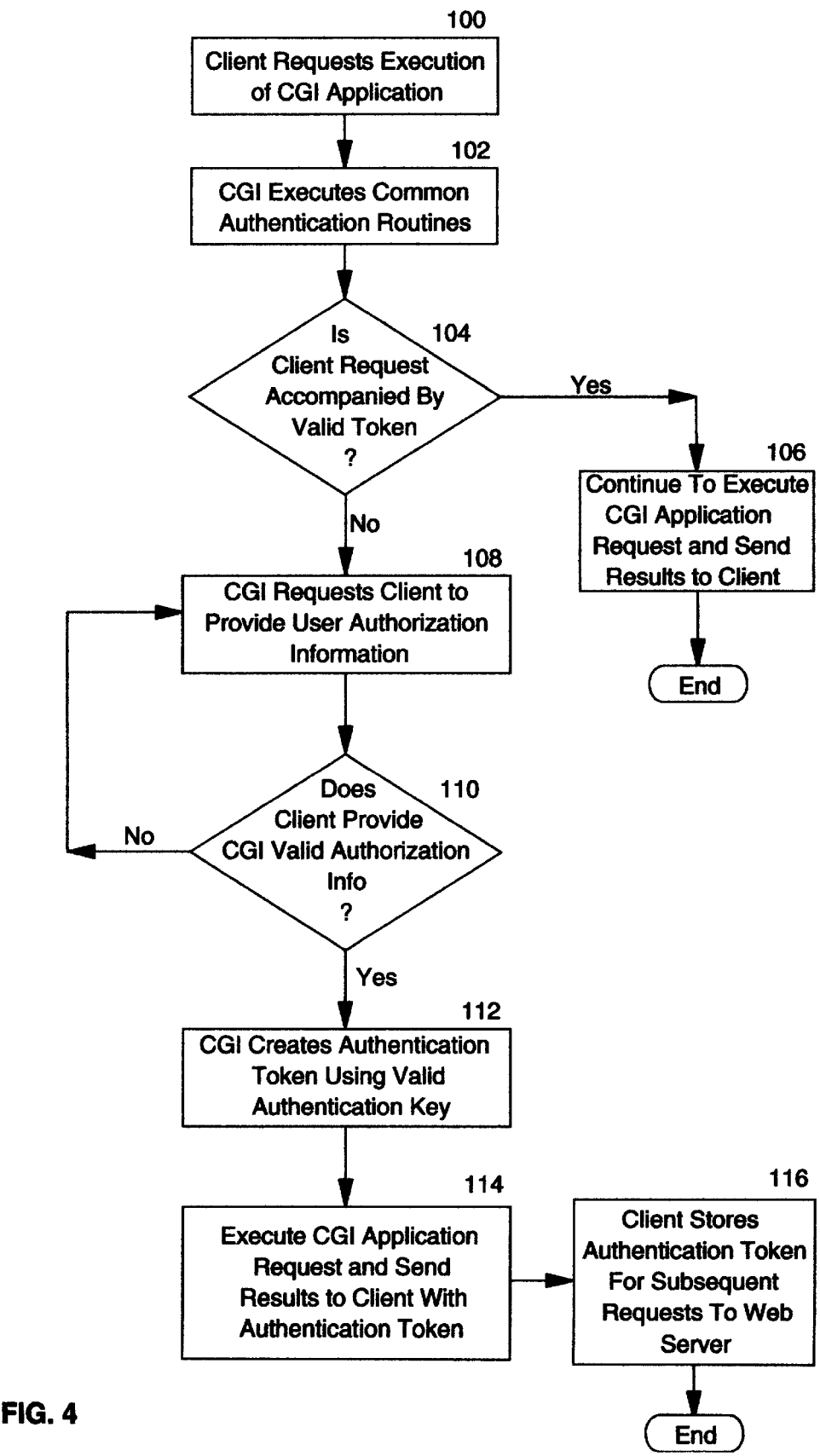
FIGS. 4–5 are flowcharts schematically illustrating operations for various aspects of the present invention.

Referring now to FIG. 4, web server-independent and operating system-independent operations for authorizing a client request to access a web server and to execute a common gateway interface application are schematically illustrated. When a user makes a client request to a web server to execute a CGI application (Block 100), common CGI authentication routines are executed (Block 102) and a determination is made whether the client request is accompanied by a valid authentication token (Block 104). The validity of an authentication token is preferably based upon an authentication key and token data used to create the token, as described below.

If the client request is accompanied by a valid authentication token, the requested CGI application continues execution and processing results are transmitted back to the client (Block 106). If the client request is not accompanied by a valid authentication token, the CGI requests the client to provide user authorization information for executing the CGI application (Block 108). This is typically implemented via an authorization screen presented to the user via the client. As is known to those skilled in the art, an authorization screen may include data entry locations in which a user is prompted to provide his/her name and a password. However, various methods of obtaining user authorization information may be utilized without departing from the spirit and intent of the present invention.

When user authorization information is submitted from the client to the web server, a determination is made whether the submitted user authorization information is valid (Block 110). For example, supplied information is compared to an operating system independent access control list by the CGI. If the submitted user authorization information is not valid, the CGI returns to the client another request for valid user authorization information. The server is actually replying to the client request. Typically, this is implemented via another authorization screen presented to the user via the client, as described above. If the submitted user authorization information is valid, the CGI authentication routine creates an authentication token using a valid authentication key and data derived from the user information (Block 112). The requested CGI application continues execution and processing results produced therefrom, along with the valid authentication token, are transmitted to the client (Block 114). The client stores the authentication token received from the web server (Block 116). When subsequent client requests to execute a CGI application in the set (not just any CGI) are made, the client includes the stored authentication token with the request to the web server. The token is retained in client memory, so a copy of the token is returned. The CGI determines if the authentication token was created using a valid authentication key and token data (Block 104). If the authentication token is invalid, then the CGI application returns an authentication request to the client (Block 108). Typically, the number of requests from a client accompanied by authentication tokens having invalid authentication codes would be limited in number. Because HTTP transactions are short-lived, CGI execution is necessarily short lived. To provide acceptable performance for end users and to modularize software functionality, nontrivial CGI applications are comprised of a set of small, limited function CGIs which in aggregate provide a complete software product. For example, in a CGI based network administration tool implemented as a set of CGIs, one CGI could report network status, another could be used to stop and start network links, another could display error logs, and so forth.

Whenever a previously unauthenticated client requests to execute any CGI in the set of CGIs, an authorization request is returned. Conversely, an authenticated client may access every CGI in the set without reauthentication. These results are achieved by embedding common authentication program instructions in each CGI. This provides a common authentication mechanism for the set of applications. When a CGI from the set executes, it determines if a valid token was received and then continues to execute subsequent CGI-specific instructions for a valid token or executes common, authentication routines. By providing access authorization via a token, HTTP-layer authentication is unnecessary.

A preferred authentication token is an HTTP cookie. An HTTP cookie is an object used to store various types of information on a client, such as web server connection state information. Uses of cookies include customizable client views of web pages and shopping carts for web-based commerce. HTTP cookies may be transported between a client and web server in HTTP headers that web servers and clients use to communicate at the HTTP layer.

Still referring to FIG. 4, when a client sends a request (Block 100), unaccompanied by a cookie, to a web server to execute a CGI application, the CGI creates a cookie (Block 112) if valid authorization information is provided by the user (Blocks 108–110). Included in the cookie is path information which contains a virtual path to the set of CGIs. Whenever a URL containing this virtual path is requested by the client, the client will send the cookie with the request. The cookie is then transmitted to the client (Block 114). Whenever the client makes subsequent requests to execute a CGI application within the set of CGI applications, the cookie accompanies the client request. On subsequent client requests, the CGI determines if the cookie is valid (Block 104). If the cookie is not valid, then the CGI application returns an authentication request to the client (Block 108). If the cookie is valid, the requested CGI application continues execution and processing results are transmitted back to the client (Block 106). As stated in the more general description of an authentication token, a cookie is valid when it was forged from a valid key and contains valid token data.

Authentication Token Encryption

Figure 5:
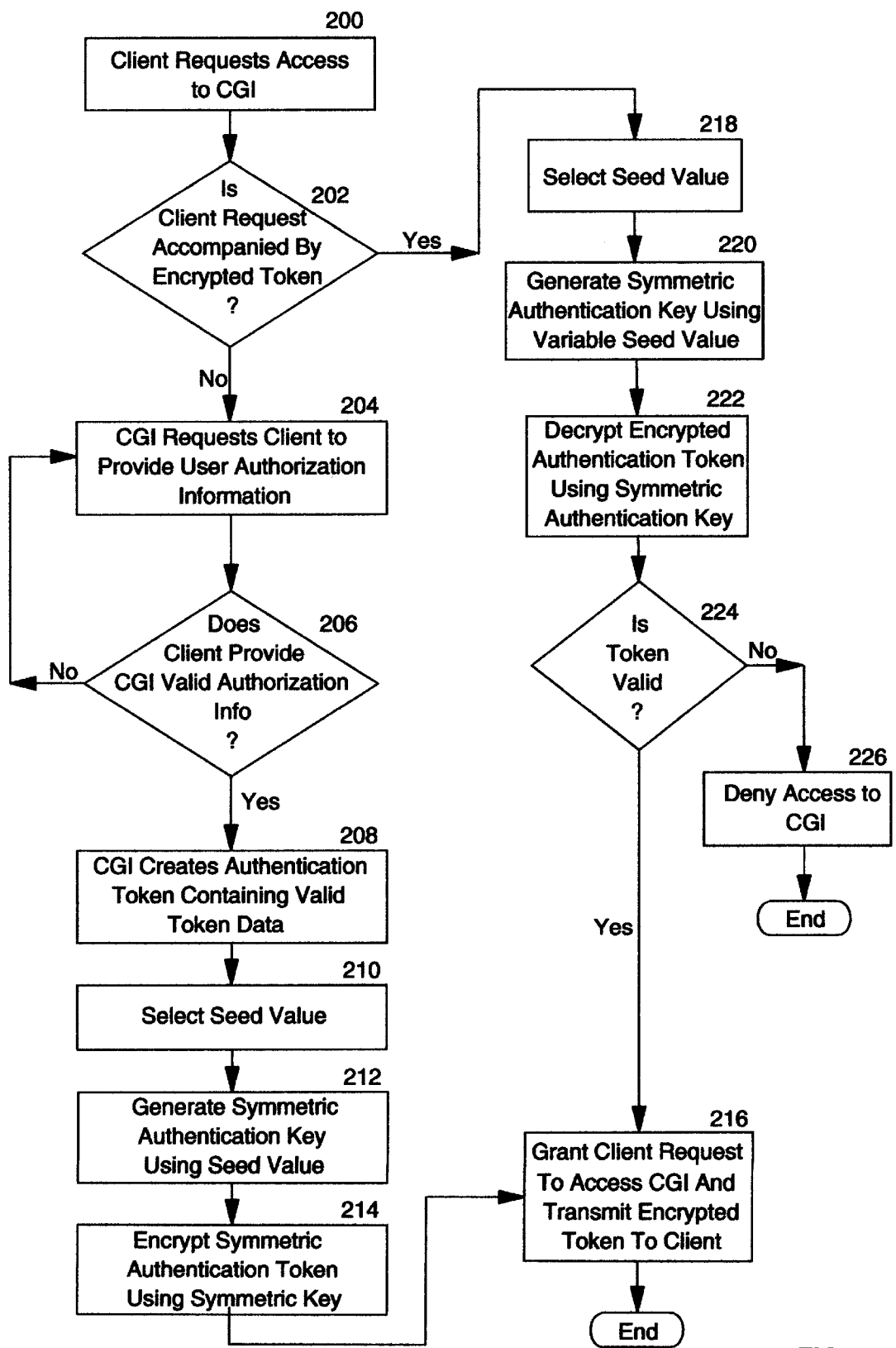

Referring now to FIG. 5, operations for authorizing a client request to access a web server and to execute applications thereon using authentication token encryption are schematically illustrated. When a user makes a client request to access a CGI (Block 200), the CGI executes common authentication routines as described above with respect to FIG. 4. A determination is made whether the client request is accompanied by an encrypted authentication token (Block 202). A preferred authentication token is an HTTP cookie, as described above. If the client request is not accompanied by an encrypted authentication token, the CGI requests the client to provide user authorization information (Block 206). This is typically implemented via an authorization screen presented to the user via the client. As is known to those skilled in the art, an authorization screen may include data entry locations in which a user is prompted to provide his/her name and a password. However, various methods of obtaining user authorization information may be utilized without departing from the spirit and intent of the present invention.

When user authorization information is submitted from the client to the CGI, a determination is made whether the submitted user authorization information is valid (Block 206), for example, by comparing to an operating system independent access control list. If the submitted user authorization information is not valid, the CGI submits to the client another request for valid user authorization information. Typically, this is implemented via another authorization screen presented to the user via the client, as described above. If the submitted user authorization information is valid, the CGI creates an authentication token containing valid token data (Block 208).

Once an authentication token is created (Block 208), a seed value is selected (Block 210). A seed can be any type of data having a value. Preferably, a seed is data that changes over time, including, but not limited to, time of day, day of the week, day of the month, day of the year, and the like. Seeds having values that do not vary with time may be used as well, including, but not limited to, user names and computer network addresses. Furthermore, a seed for encryption may be generated from any number of varying values by some function which provides a one to one mapping of input values to allowable, output seed values. The appropriate input values and functions are chosen by the CGI authentication routine developer. In the case of a single input value no mapping function may be required (the identity function). For example, the day of the year could be used as the seed value.

Once a seed value is selected (Block 210), a symmetric key is generated by the CGI receiving the client request (Block 212). As is known to those with skill in the art, a symmetric key is a key that can be used for both encryption and decryption. According to the present invention, the CGIs receiving client requests perform both encryption and decryption of an authentication token. Once a symmetric key is generated (Block 212), the authentication token created by the CGI (Block 208) is encrypted using the generated key (Block 214). The encrypted authentication token is returned to the client requesting access to the web server and access to the web server is granted (Block 216).

If a client request is accompanied by an encrypted authentication token (Block 202), the CGI selects a seed value using the predetermined input values and seed function (Block 218). Once a seed value is selected, a symmetric key is generated by the CGI (Block 220). The generated symmetric key is then used to decrypt the received encrypted authentication token (Block 222).

Once the received authentication token is decrypted, a determination is made whether the authentication token is valid (Block 224). The validity of the authentication token is preferably based upon the token data contained within the token, as described above. Because dynamic input can be used to create a seed value, the symmetric key generated for the current transaction may differ from the one used originally to create the token. If the token data is not valid or a different symmetric key is used for decryption then the authentication token is not valid and client access to the web server and applications available therethrough is denied (Block 226). Operations may terminate at this point or the client may proceed with operations for providing authorization information to obtain a valid authentication code. If the authentication token is valid, access to the CGI is granted to the requesting client (Block 216).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of authorizing a client request to a web server to execute any one of a plurality of CGI applications hosted by a web server having an application programming interface (API), wherein each CGI application in a set comprises a user authentication routine that executes independently from the web server API, wherein a client carries out the steps of:

sending a client request to execute a first CGI application within the set to the web server;

receiving from the web server an authentication token created by the first CGI application user authentication routine, wherein the authentication token authorizes execution of the first CGI application and each CGI application within the set for a predetermined time duration; and responsive to receiving the authentication token created by the CGI application user authentication routine from the web server, storing the authentication token for use with subsequent CGI application execution requests to the web server; and wherein the web server carries out the steps of:

receiving the client request to execute a first CGI application from the client;

responsive to receiving the client request, executing the first CGI application user authentication routine to create the authentication token containing information verifiable by the user authentication routine of each CGI application within the set;

executing the first CGI application; and sending the authentication token created by the first CGI application user authentication routine to the client with results of the first CGI application execution.

2. A method according to claim 1, wherein the authentication token is an HTTP cookie.

3. A method of authorizing a client request to a web server to execute any one of a plurality of CGI applications within a first set hosted by a web server having an application programming interface (API), wherein each CGI application within the first set comprises a user authentication routine that executes independently from the web server API, said method comprising the steps of:

receiving a client request to execute a first one of the CGI applications in the first set;

responsive to receiving the client request, executing a CGI application user authentication routine to create an authentication token that can be shared by each of the CGI applications within the first set and that authorizes execution of any one of the CGI applications in the first set when subsequent client requests are made to execute any of the CGI applications in the first set during a predetermined time duration;

executing the first CGI application; and sending the authentication token created by the CGI application user authentication routine to the client with results of the CGI application execution.

4. A method according to claim 3, further comprising the steps of:

receiving from the client the authentication token created by the CGI application user authentication routine with a subsequent client request to execute a second CGI applications in the first set;

responsive to receiving the subsequent client request and authentication token created by a CGI application user authentication routine, verifying via a user authentication routine within the requested CGI application that the received authentication token is valid; and responsive to verifying that the received authentication token is valid, executing the second CGI application; and sending results of the second CGI application execution to the client.

5. A method according to claim 3, wherein said step of executing the CGI application user authentication routine to create an authentication token comprises the steps of:

requesting the client to send user identification information to the web server;

receiving user identification information from the client; and verifying the user identification information received from the client.

6. A method according to claim 3, wherein the authentication token is an HTTP cookie.

7. A data processing system for authorizing a client request to a web server to execute any one of a plurality of CGI applications within a set hosted by a web server having an application programming interface (API), wherein each CGI application within the set comprises a user authentication routine that executes independently from the web server API, said data processing system comprising:

means for receiving a client request to execute a first CGI application within the set from the client;

means, responsive to said client request receiving means, for executing a CGI application user authentication routine for the first CGI application to create an authentication token that authorizes execution of any one of the CGI applications within the set for a predetermined duration of time;

means for executing the first CGI application; and means for sending the authentication token created by the CGI application user authentication routine to the client with results of the first CGI application execution.

8. A data processing system according to claim 7, further comprising:

means for receiving from the client the authentication token created by the CGI application user authentication routine with a subsequent client request to execute a second CGI application with the set;

means, responsive to said authentication token receiving means, for verifying via a CGI application user authentication routine for the second CGI application that the received authentication token is valid; and means, responsive to said verifying means, for executing the second CGI application.

9. A data processing system according to claim 7, wherein said means for executing the CGI application user authentication routine to create an authentication token comprises:

means for requesting the client to send user identification information to the web server;

means, responsive to said means for requesting user identification information, for receiving user identification information from the client; and means, responsive to said user identification information receiving means, for verifying the user identification information received from the client.

10. A data processing system according to claim 7, wherein the authentication token is an HTTP cookie.

11. A computer program product for authorizing a client request to a web server to execute any one of a plurality of CGI applications within a set hosted by a web server having an application programming interface (API), wherein each CGI application within the set comprises a user authentication routine that executes independently from the web server API, said computer program product comprising:

a computer usable medium having computer readable program code means embodied in said medium for receiving a client request to execute a first CGI application within the set from the client;

the computer usable medium having computer readable program code means embodied in said medium, responsive to said client request receiving means, for executing a CGI application user authentication routine for the first CGI application to create an authentication token containing information verifiable by any of the CGI applications within the set and that authorizes execution of any of the CGI applications in the set within a predetermined duration of time;

the computer usable medium having computer readable program code means embodied in said medium for executing the first CGI application; and the computer usable medium having computer readable program code means embodied in said medium for sending the authentication token created by the CGI application user authentication routine to the client with results of the first CGI application execution.

12. A computer program product according to claim 11, further comprising:

computer readable program code means embodied in said medium for receiving from the client the authentication token created by the CGI application user authentication routine with a subsequent client request to execute a second CGI application;

computer readable program code means embodied in said medium, responsive to said authentication token receiving means, for verifying via a CGI application user authentication routine for the second CGI application that the received authentication token is valid; and computer readable program code means embodied in said medium, responsive to said verifying means, for executing the second CGI application.

13. A computer program product according to claim 11, wherein said computer readable program code means embodied in said medium for executing the CGI application user authentication routine to create an authentication token comprises:

computer readable program code means embodied in said medium for requesting the client to send user identification information to the web server;

computer readable program code means embodied in said medium, responsive to said user identification information requesting means, for receiving user identification information from the client; and computer readable program code means embodied in said medium, responsive to said user identification information receiving means, for verifying the user identification information received from the client.

14. A computer program product according to claim 11, wherein the authentication token is an HTTP cookie.

* * * * *

UNITED STATES PATENT AND TRADEMARK OFFICE
CERTIFICATE OF CORRECTION

PATENT NO.    : 6,049,877
DATED         : April 11, 2000
INVENTOR(S)   : John Gregg White It is certified that error appears in the above-identified patent and that said Letters Patent is hereby corrected as shown below:

<u>Column 10,</u>
Line 55, should read -- application in the first set; --

Signed and Sealed this

Twenty-fourth Day of December, 2002

JAMES E. ROGAN
*Director of the United States Patent and Trademark Office*